March 15, 1966     E. E. DORKINS     3,240,279

FLUID TRANSMISSION MECHANISM

Filed June 4, 1963     9 Sheets-Sheet 1

INVENTOR.
Evan E. Dorkins
BY
Teare, Fetzer & Teare
ATTORNEYS

INVENTOR.
Evan E. Dorkins

March 15, 1966 E. E. DORKINS 3,240,279
FLUID TRANSMISSION MECHANISM
Filed June 4, 1963 9 Sheets-Sheet 4

INVENTOR.
EVAN E. DORKINS
BY
Teare, Fetzer & Teare
ATTORNEYS

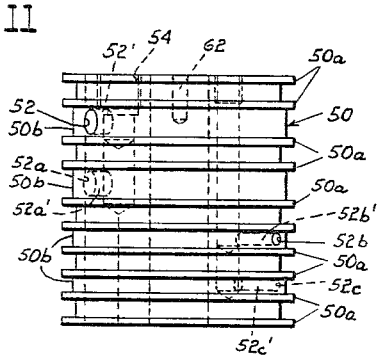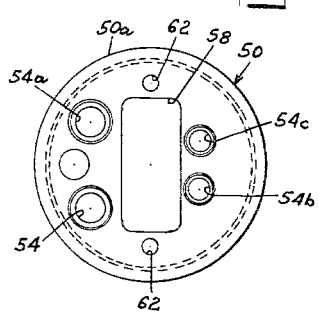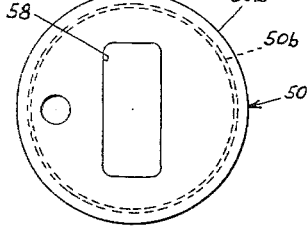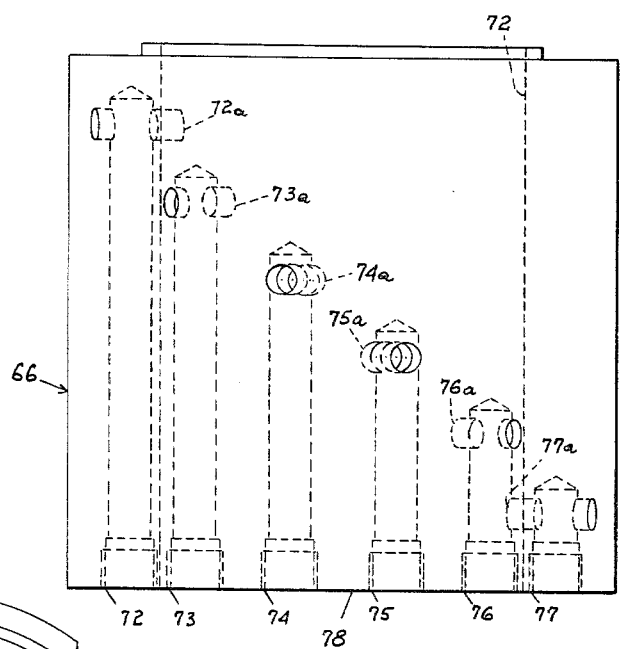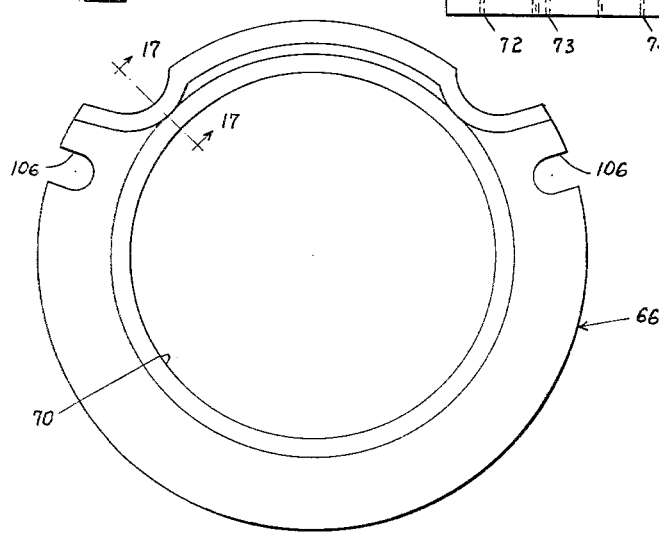

March 15, 1966   E. E. DORKINS   3,240,279
FLUID TRANSMISSION MECHANISM
Filed June 4, 1963   9 Sheets-Sheet 6

INVENTOR.
Evan E. Dorkins
BY
Teare, Fetzer & Teare
ATTORNEYS

March 15, 1966  E. E. DORKINS  3,240,279
FLUID TRANSMISSION MECHANISM
Filed June 4, 1963  9 Sheets-Sheet 7

INVENTOR.
Evan E. Dorkins
BY
Teare, Tetzer & Teare
ATTORNEYS

March 15, 1966 E. E. DORKINS 3,240,279
FLUID TRANSMISSION MECHANISM
Filed June 4, 1963 9 Sheets-Sheet 8

INVENTOR.
Evan E. Dorkins
BY
Teare, Fetzer & Teare
ATTORNEYS

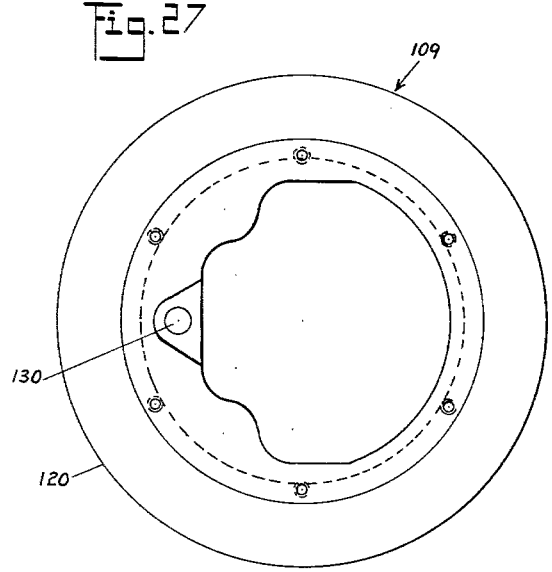
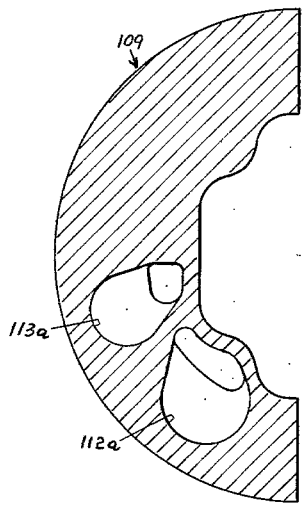
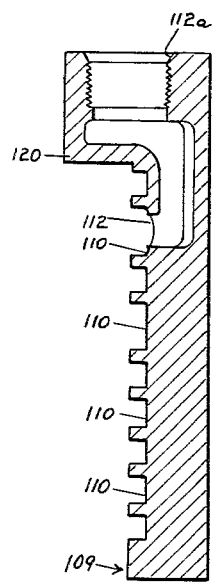
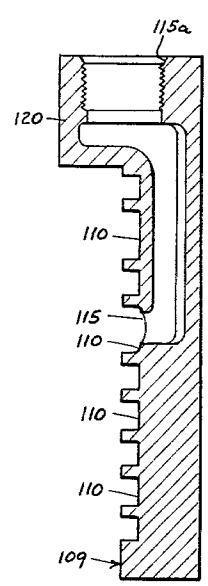
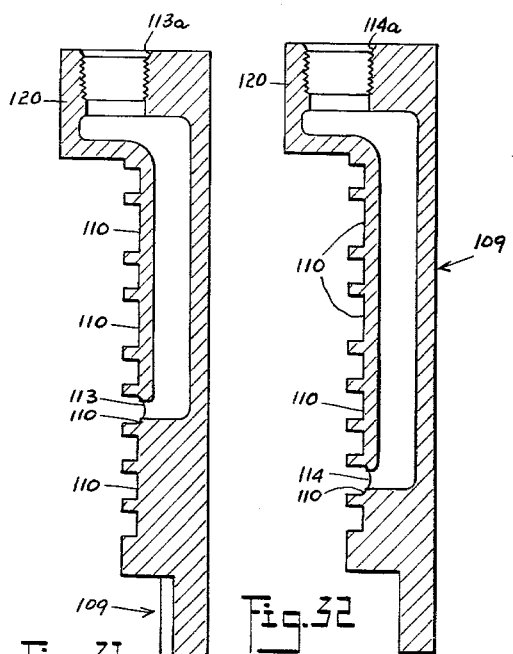

United States Patent Office 3,240,279
Patented Mar. 15, 1966

1

3,240,279
FLUID TRANSMISSION MECHANISM
Evan E. Dorkins, Bay Village, Ohio, assignor to The Ohio Brass Company, Mansfield, Ohio, a corporation of New Jersey
Filed June 4, 1963, Ser. No. 285,468
9 Claims. (Cl. 173—43)

This invention relates in general to fluid transmission mechanism, and more particularly to fluid transmission mechanism adapted for use in transmitting actuating fluid from a relatively stationary section or area, to an area or section which is movable with respect to the stationary section or area.

An example of an environmental use of the fluid transmission mechanism of the invention is in the utility truck field, wherein a derrick or other movable apparatus is mounted on a vehicle, and which may be adapted for handling and erecting various objects, such as for instance telephone or telegraph poles, or may be used for elevating a workman adjacent an overhead object, such as for instance power lines, street lights, or the like. Such derricks may conventionally have a plurality of fluid motor operated mechanisms mounted thereon, and generally the derrick is rotatable both in a horizontal plane about a generally vertical axis, and is pivotable in a generally vertical plane about a horizontally disposed axis, for convenient positioning of the elevating apparatus or derrick with respect to the vehicle. The source of actuating fluid for the motor units mounted on the derrick boom may conventionally include a reservoir, a prime mover and a pump, generally located on the vehicle chassis, and accordingly, provision must be made for transmitting the pressurized actuating fluid from the source on the chassis to the motor units located on the movable derrick boom.

In the past, the means for transmitting such pressurized fluid in the utility truck field has often comprised a plurality of flexible, fluid transmitting lines, formed of resilient or rubber-like material, so that upon movement of the derrick boom, the lines could twist or bend with such derrick movements and with respect to the vehicle chassis, without fracturing of such lines. However, such an arrangement of twisting flexible fluid transmitting lines materially limits the range of movement of a derrick and gives a relatively short service life to such lines, and many maintenance problems have arisen due to the twisting and eventual failure of such fluid transmitting lines.

The present invention provides a novel arrangement of fluid transmitting means which eliminates twisting of flexible hoses, in order to transmit actuating fluid to, for instance, motor units disposed on an apparatus which is movable with respect to another area or support member, and eliminates twisting and early failure of flexible hoses.

Accordingly, an object of the invention is to provide a novel fluid transmitting arrangement for transmitting actuating fluid from one area, to another area which is relatively movable with respect to the first mentioned area, and without the need for twisting of flexible fluid transmitting lines.

Another object of the invention is to provide a novel fluid transmitting mechanism for transmitting pressurized actuating fluid from one area, to another area which is relatively movable with respect to the first mentioned area, and wherein such mechanism comprises a collector ring arrangement having an exterior housing and an interior rotatable ring element coacting with the housing to define a fluid receiving cavity, and with passageway means in the exterior housing communicating with said cavity, and with passageway means in the rotatable ring element communicating said cavity with the exterior of the ring element, whereby actuating fluid can be passed from one of the areas, to the other of the areas, during movement of one of the areas with respect to the other of the areas, and without any twisting of flexible fluid lines.

A more specific object of the invention is to provide a pedestal mounted derrick on a support, wherein the derrick is rotatable in a generally horizontal plane about a generally vertical axis, and wherein fluid transmitting means is disposed in the pedestal, for transmitting pressurized actuating fluid from a source on the support, to the derrick, and wherein such fluid transmitting means comprises exterior housing elements connected to the relatively stationary pedestal, and enclosing interior, collector ring elements, connected to the relatively movable derrick, the latter elements defining spaced fluid receiving cavities, and with passageway means in said housing elements communicating with respective of said cavities, and with passageway means in said collector ring elements communicating said cavities with the exterior of such fluid transmitting mechanism, whereby pressurized fluid may be readily transmitted from the source to the relatively movable derrick without the need of any twisting of flexible fluid transmitting line means.

Other objects and advantages of the invention will be apparent from the following description taken in conjunction with the accompanying drawings, wherein:

FIG. 11 is a side elevational view of the collector ring adapted to be disposed interiorly of the housing element of FIGS. 5 through 10;

FIG. 12 is a top plan view of the FIG. 11 collector ring element;

FIG. 13 is a bottom plan view of the FIG. 11 collector ring;

FIG. 14 is an elevational view of the next housing element adapted to be disposed in stacked relation above the first mentioned housing element of FIGS. 5 through 10;

FIG. 15 is a top plan view of the FIG. 14 exterior housing;

FIG. 27 is a bottom plan view of the FIG. 25 member;

FIG. 28 is a sectional, fragmentary view taken generally along the plane of line 28—28 of FIG. 25, looking in the direction of the arrows;

FIG. 29 is a sectional view taken generally along the plane of line 29—29 of FIG. 26 looking in the direction of the arrows;

FIG. 30 is a sectional view taken generally along the plane of line 30—30 of FIG. 26, looking in the direction of the arrows;

FIG. 31 is a sectional view taken generally along the plane of line 31—31 of FIG. 26 looking in the direction of the arrows; and FIG. 32 is a sectional view taken generally along the plane of line 32—32 of FIG. 26 looking in the direction of the arrows.

Figure 1:
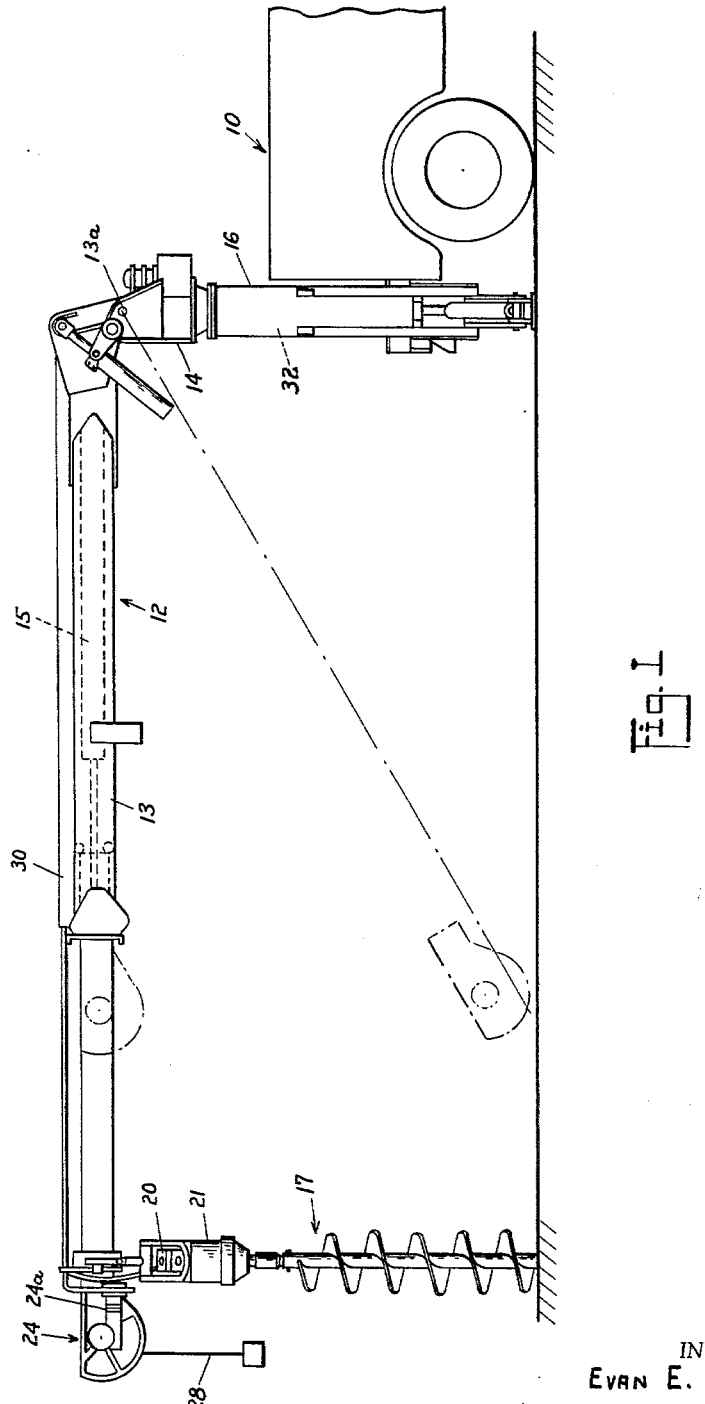
FIG. 1 is a generally fragmentary, side elevational view of a type of pedestal-mounted derrick with which the fluid transmitting mechanism of the invention may be conveniently utilized, and a derrick which utilizes a plurality of fluid powered motor units mounted thereon, or attached thereto.

Referring now again to the drawings, there is shown a wheeled utility vehicle 10, having a truck body which carries a movable derrick 12 thereon. The derrick boom 13, which may be of the telescopic or extensible type, may be pivotally mounted as at 13a for swinging movement in a generally vertical plane, and on a superstructure frame 14. Frame 14 is adapted for rotational movement about a generally vertical axis of stationary pedestal frame 16, for swinging the boom in a generally horizontal plane and through a predetermined range. The boom may have a fluid powered motor unit 15 disposed interiorly thereof in the conventional manner, for extending and retracting the boom.

The derrick may be of the type which has an earth boring auger 17 adapted for suspension therefrom, for drilling holes in the ground, and with such earth boring auger being driven by means of a rotary, fluid powered motor unit 20, mounted on the transmission housing 21 of the earth boring auger. The derrick may also have a powered, head sheave assembly 24, including a fluid powered motor unit 24a, for selectively rotating the sheave, which sheave is adapted to coact with a flexible cable or line 28, for raising or lowering objects coupled to the cable. Extendable or telescopic, fluid transmitting line means 30 of known construction may be provided on the boom, extending between the pedestal structure 16 of the boom and the fluid powered motor units (e.g. 20, 24a) for furnishing pressurized actuating fluid to the motor units. The vehicle conventionally has a source of pressurized fluid, including a powered pump and a reservoir (not shown) mounted thereon. The pump is contionally located at the forward end of the vehicle chassis, connected to a power take-off from the motor of the vehicle, but it may be located at other locations on the vehicle, and may be driven by a completely separate prime mover rather than from the motor of the vehicle. The latter pump transmits the fluid through a desired number of fluid transmitting tubes or hoses to the pedestal 16 from whence the fluid is adapted to be transmitted up along or through the pedestal, to the telescopic line means 30 and thence to the aforementioned motor units disposed along the boom, after which it is returned vice versa to the reservoir. As aforediscussed, in the past, this transmission of pressurized actuating fluid to and from the motor units has often been accomplished by the use of flexible tubing or hose extending through or along the hollow, tube-like pedestal, and connected to, for instance, the extensible line means 30. The flexible tubes or hoses were of such length and comprised of such material, that they could be twisted and thereby provided for rotary or swinging movement of the boom in a horizontal direction. However, such twisting of the tubing lines during relative movement between the boom and its support, caused relatively rapid failure of the tubing lines, as well as prevented completely free rotary movement of the boom.

Therefore, in accordance with the instant invention, a novel fluid transmitting means 32 is disposed preferably interiorly of hollow pedestal 16, for transmitting pressurized fluid from the aforementioned source, to the motor units disposed on the movable boom. In the embodiment shown, such fluid transmitting means comprises a plurality of collecting ring mechanisms A, B and C (FIG. 2) disposed in stacked relation interiorly of the hollow pedestal 16, for providing a plurality of distributing ports for the pressurized fluid coming from and going back to the source. It will be understood of course, that rather than having the stacked, multiplicity of collector rings assemblies shown, only one of the collector ring units could be utilized, for transmitting fluid to and from relatively movable areas or sections.

Figure 5:
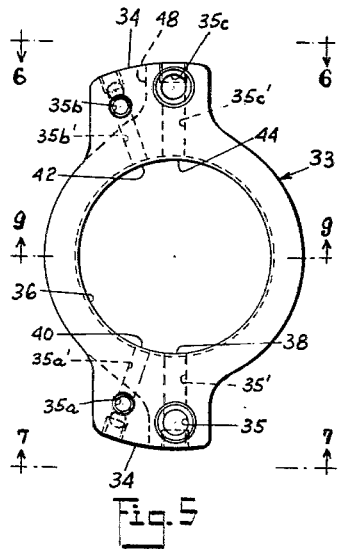
FIG. 5 is an enlarged, bottom plan view of the lower most one of the exterior housing elements for the collector ring assemblies illustrated in FIG. 2.
Figure 7:
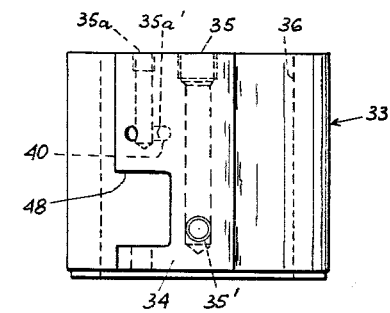
FIG. 7 is a side elevational view of the FIG. 5 housing taken generally along the plane of line 7—7 of FIG. 5.
Figure 9:
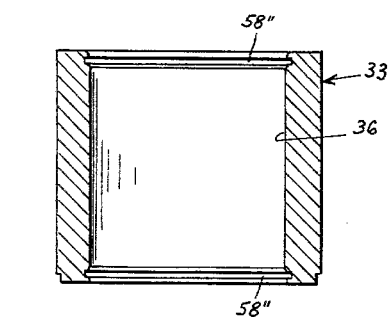
FIG. 9 is a sectional view taken generally along line 9—9 of FIG. 5, looking in the direction of the arrows.
Figure 6:
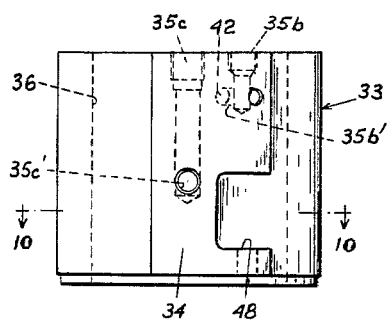
FIG. 6 is a side elevational view of the FIG. 5 housing taken generally along the plane of line 6—6 of FIG. 5, looking in the direction of the arrows.
Figure 8:
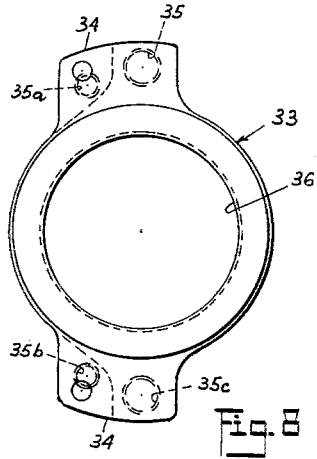
FIG. 8 is a top plan view of the FIG. 5 housing.
Figure 10:
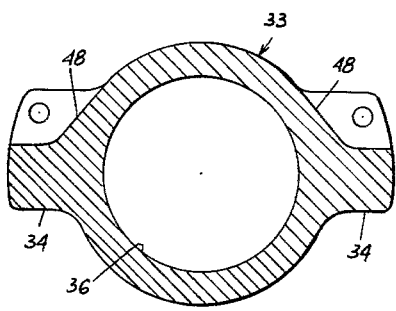
FIG. 10 is a sectional view taken generally along the plane of line 10—10 of FIG. 6, looking in the direction of the arrows.
Figure 16:
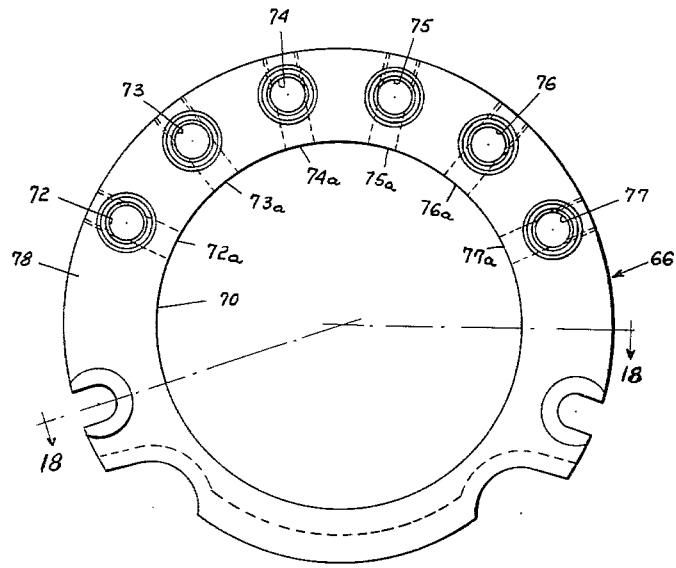
FIG. 16 is a bottom plan view of the FIG. 14 housing.
Figure 18:
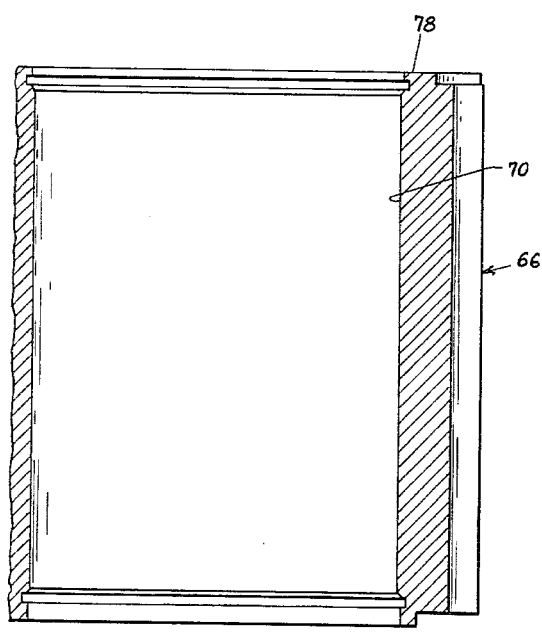
FIG. 18 is a sectional view taken generally along the plane of line 18—18 of FIG. 16 looking in the direction of the arrows.
Figure 17:
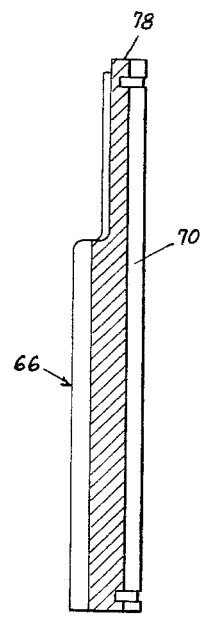
FIG. 17 is a sectional view taken generally along the plane of line 17—17 of FIG. 15 looking in the direction of the arrows.

Referring now specifically to unit A, the lowest in the stacked assembly, the latter unit comprises an outer housing member 33 of generally cylindrical configuration, open at both ends thereof, and having wing portions 34. The bottom surface of the wall of housing 33 has ports 35, 35a, 35b and 35c opening thereonto, with each of such ports communicating with a respective transverse passageway 35′, 35a′, 35b′, 35c′, which opens onto the interior surface 36 of the housing at different elevations. In other words, port 35 opens at 38 (FIG. 5) onto the interior surface 36 of the housing member 33; port 35a opens at 40; port 35b opens at 42 and port 35c opens at 44, all of which locations, in the direction vertically of the housing, are at different elevations It will be seen that the transversely extending passageways 35′, 35a′, 35b′ and 35c′ may be formed by drilling from exteriorly of the housing 33, radially inwardly, and then such drill hole may be plugged adjacent its exterior end by means of a conventional plug, thus communicating the interior surface 36 of the housing with each respective port 35, 35a, 35b, and 35c. As can be best seen in FIGS. 6 and 7, the aforementioned wings 34 are recessed as at 48 for providing clearance for a threaded member therein, for securing such housing member to the other superimposed housing members, and as will be hereinafter described in greater detail.

Disposed interiorly of housing 33 is a rotatable ring member 50. Ring member 50 (FIG. 11) is of generally cylindrical exterior configuration, but having a plurality of circumferentially extending paired flanges 50a thereon, defining grooves therebetween. Communicating with a respective one of each of the grooves 50b defined between adjacent sets of paired flanges is a port 52, 52a, 52b and 52c, communicating with a respective passageway 52′, 52a′, 52b′, 52c′, which extends radially inwardly with respect to the member 50 and which communicates with a respective vertically extending passageway 54, 54a, 54b, and 54c. Each of the latter passageways opens onto the top surface of inner ring member 50, and as best shown in FIG. 12. When member 50 is rotatably disposed in its exterior housing 30, in the manner shown in FIG. 2, port 35 in the housing communicates with port 54 in the ring member 50 and via passageway 35′, port 52 and passageway 52′. Likewise, the other ports 35a, 35b, and 35c in the housing 33 communicate with a respective port 54b, 54c, and 54a in the inner ring member. The flanges 50a on member 50 engage in sealing relation with the inner surafce 36 of the housing 33 and insure proper distribution of the pressurized fluid to its desired port. Since the central ring member 50 is rotatable with the rotation of the derrick boom, and the outer housing member 33 is stationary with the pedestal 16, it will be seen that fluid coming into and passing from the ports 35, 35a, 35b and 35c on the underside of the housing member 33 can pass into and out of ports 54, 54a, 54b and 54c, which ports rotate with the rotation of the derrick. As can be best seen in FIG. 3, the ports 54 54c are accessible from the top through the central openings in the inner movable ring members of units A, B and C, and thus may be readily attached as by means of flexible conduit to the extensible fluid transmitting lines 30 which are adapted to transmit operating fluid along the derrick to the aforementioned fluid powered motor units thereon. Thus the pressurized fluid can be transmitted to the motor units without the need for any twisting of flexible lines in the pedestal during relative movement between the derrick boom and the relatively stationary pedestal 16. Member 50 preferably has a passageway 58 (FIGS. 12 and 13) extending completely therethrough, and may be rotatably retained in housing 33 and against axial movement by arcuate keepers 58' of conventional construction disposed in circumferential slots 58" in the housing 33.

Stacked on top of unit or assembly A is a unit or assembly B, with the assemblies A and B having guide pins 59 (FIG. 2) coacting between openings 62 in the inner ring member 50 and the superimposed inner ring member of assembly B.

Figure 19:
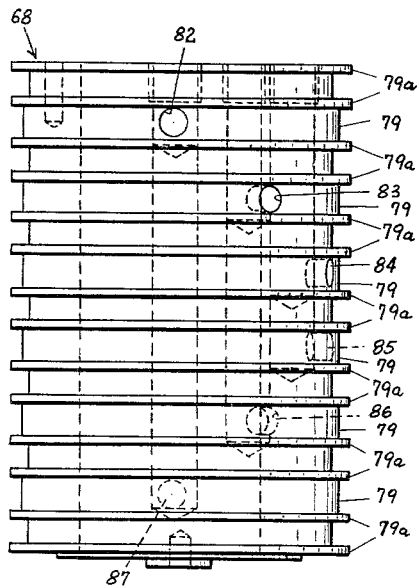
FIG. 19 is an elevational view of the collector ring element adapted to be disposed in the housing of FIGS. 14 to 18.
Figure 20:
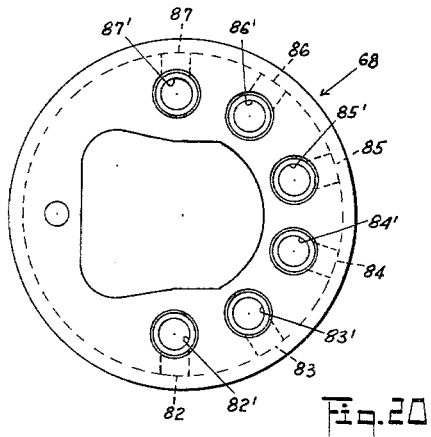
FIG. 20 is a top plan view of the ring element of FIG. 19.
Figure 21:
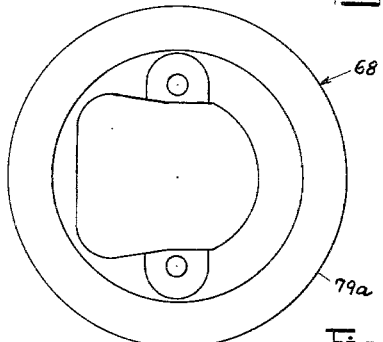
FIG. 21 is a bottom plan view of the ring element of FIG. 19.

Assembly B comprises an outer housing member 66 and an inner rotatable ring member 68, in a generally similar manner as aforediscussed for assembly of unit A. However, assembly B is a six port assembly, or in other words has six ports for the distribution of actuating fluid along the pedestal. Housing 66 is of generally cylindrical configuration, having an interior surface 70, and with there being six ports, 72 through 77 opening on the bottom surface 78 thereof, and extending up through generally vertically extending passageways to transversely extending ports 72a through 77a, communicating in circumferentially spaced relation with the interior surface 70, and at different elevations with respect to member 66. Disposed in housing 66 is the interior collector ring member 68 (FIGS. 19 and 20) having a plurality of grooves 79, in this instance six, formed between adjacent paired sets of flanges 79a, and extending circumferentially there about, with each of the grooves being disposed at an elevation in coacting relationship with one of the aforementioned ports 72a through 77a, opening onto the interior of member 66. Each groove 79 has a port 82 through 87 communicating with each of the grooves 79 and then communicating through generally vertically extending passageways to open at 82' through 87' onto the top surface of the collector ring member 68.

Figure 23:
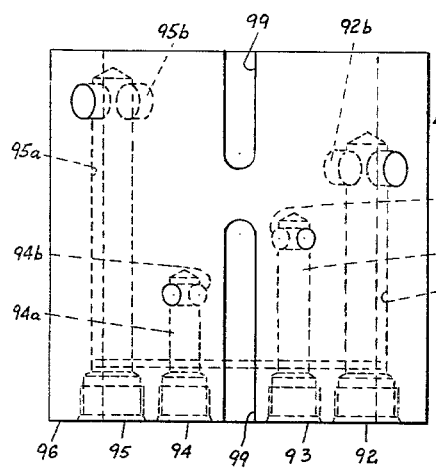
FIG. 23 is an elevational view of the housing of FIG. 22 taken from the left hand side thereof.
Figure 22:
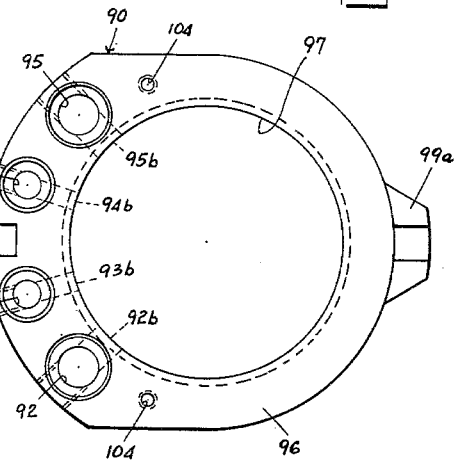
FIG. 22 is a bottom plan view of the uppermost housing member in the assembly of FIG. 2.
Figure 24:
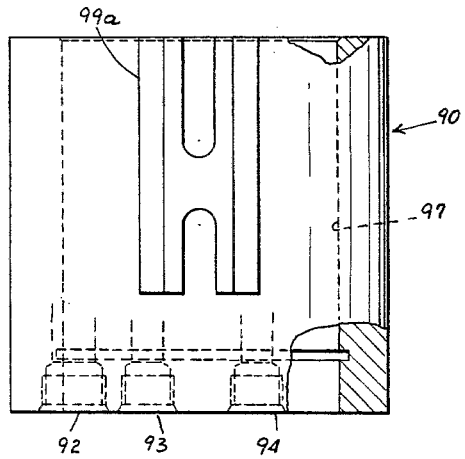
FIG. 24 is a partially broken, elevational view of the housing of FIG. 22 taken from the right hand side thereof.

Disposed in stacked relation on assemblies A and B is assembly C which is of greater diametrical dimension as compared to assemblies A and B. Assembly C may comprise a housing member 90, FIGS. 22 through 24 inclusive, of generally cylindrical configuration, and having ports 92 through 95 opening onto the bottom surface 96 thereof. It will be seen that these ports are disposed far enough away from the center or axis of member 90 so that such ports are readily accessible for attachment of lines from the source of fluid pressure, and such ports are preferably provided with some means, such as a threaded entranceway, for conveniently attaching fluid transmission lines to member 90, on the stepped portion thereof.

Communicating with each of the ports 92 through 95 is a generally vertical bore or passageway 92a through 95a, which then turns inwardly and opens as at 92b through 95b respectively, onto the interior surface 97 of member 90, and at a different elevation with respect to each of the other opening ports 92b through 95b. The exterior of member 90 may be provided with slots 99 and slotted lugs 99a thereon (FIGS. 23, 24), which may be adapted to receive therein a pin 100 or lug 102 (FIG. 2) secured to the pedestal 16, for maintaining the housing member 90 generally rigid with respect to the pedestal.

Elongated tie-rods 103 (FIG. 2) may be utilized for tying together all of the exterior housing members of the assembly and which may be threaded into openings 104 (FIG. 22) in the housing member 90 of assembly C, and which then extend downwardly through slots 106 in housing 66 of assembly B, then through the wings 34 on each side of the housing member 33 of assembly A, and are held in position by a threaded nut 108 (FIG. 2) thus holding the exterior housing members 90, 66 and 33 together as a unit, and attached to the pedestal 16.

Figure 2:
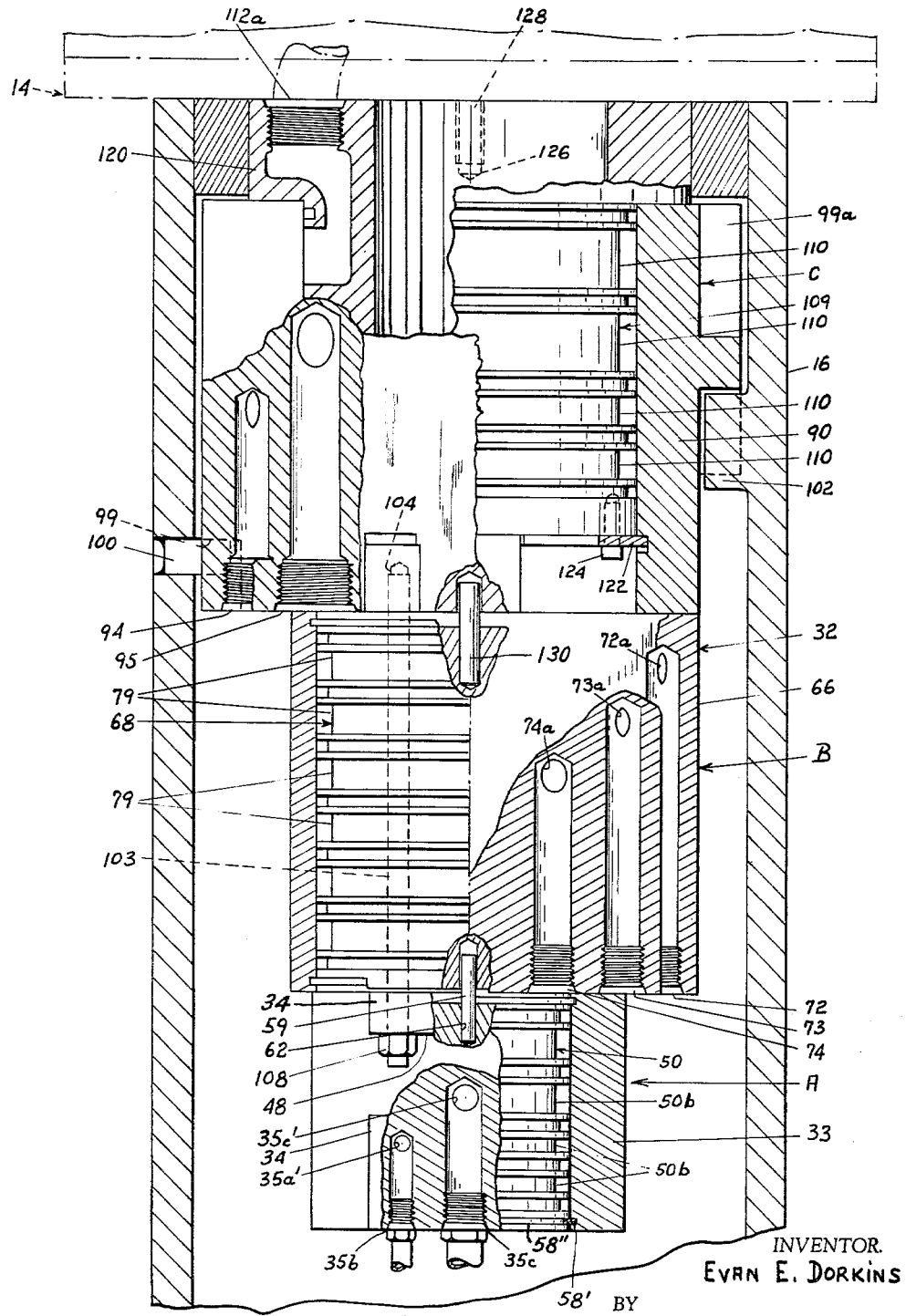
FIG. 2 is an enlarged, fragmentary, sectioned and broken elevational view of the pedestal and the fluid transmitting means disposed within the pedestal, for transmitting fluid from for instance, the chassis of the vehicle illustrated in FIG. 1, to the movable derrick.
Figure 3:
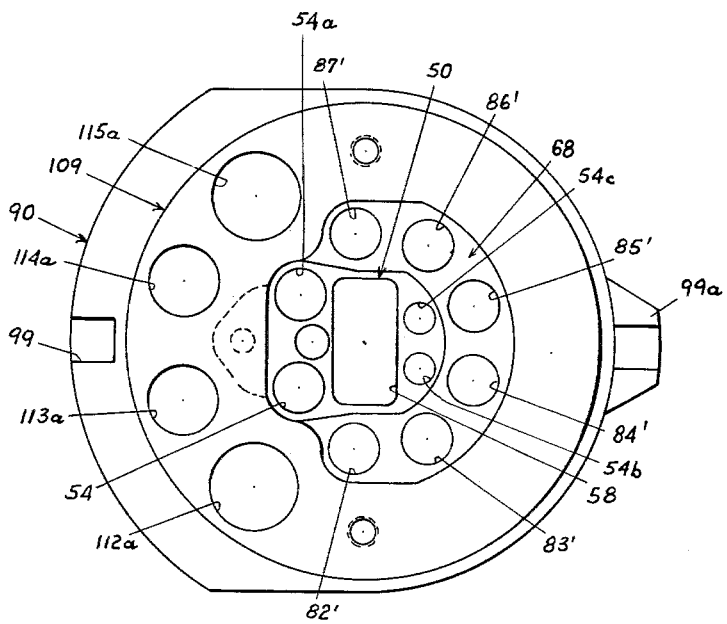
FIG. 3 is a top plan view of the FIG. 2 structure.
Figure 4:
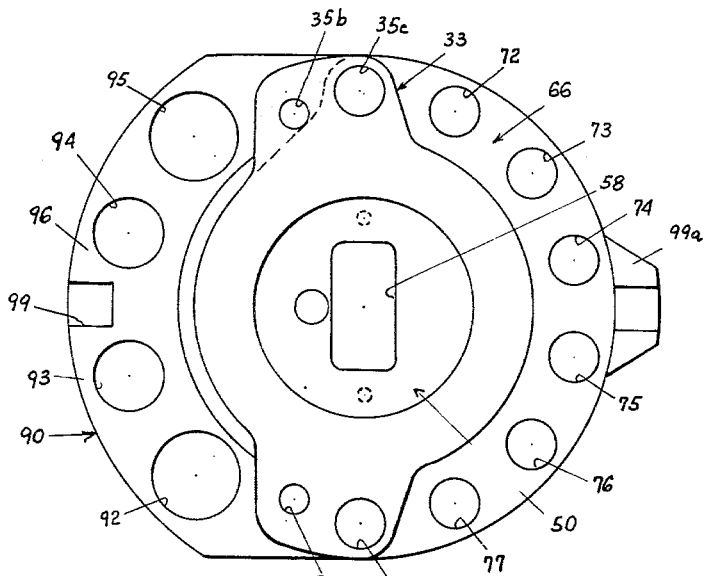
FIG. 4 is a bottom plan view of the FIG. 2 structure.
Figure 25:
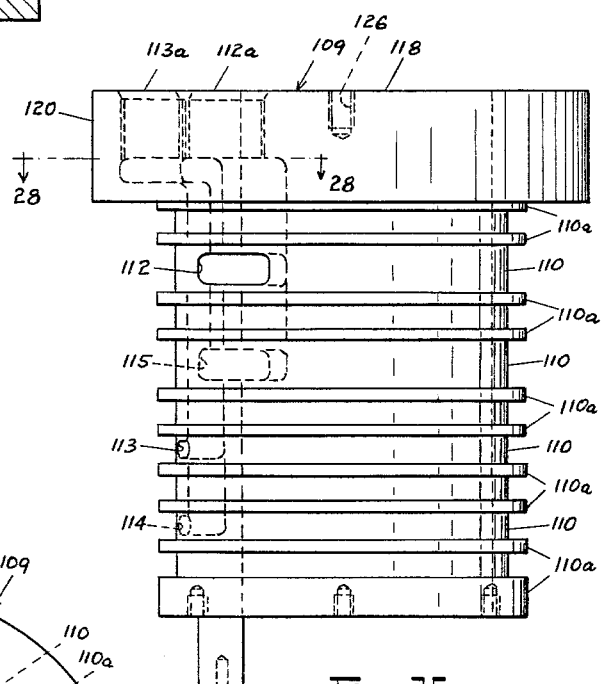
FIG. 25 is an elevational view of the interior collector ring adapted to be disposed in the housing of FIGS. 22 through 24.
Figure 26:
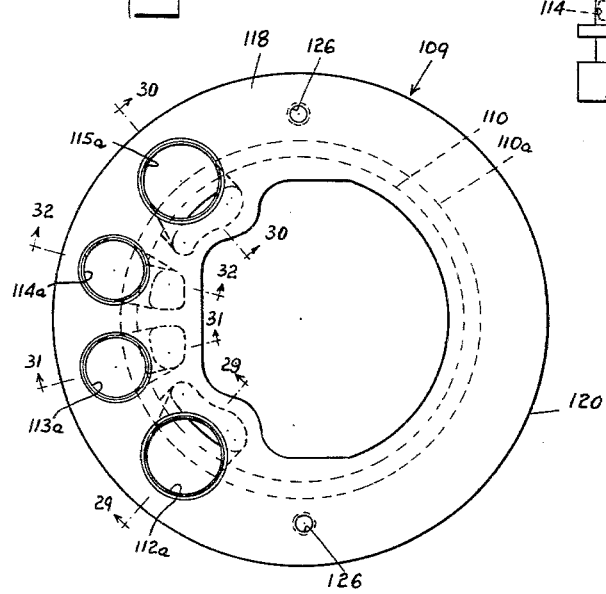
FIG. 26 is a top plan view of the FIG. 25 member.

Disposed interiorly of housing 90 is a collector ring member 109 having in this instance four grooves 110 defined by flanges 110a on either side of the respective grooves. Such collector ring member has passageways communicating with each of the grooves therein as at 112 through 115, and then extend upwardly to open as at 112a through 115a onto the top surface 118 of member 109. As shown in FIGS. 2 and 25, the collector ring member may have an enlarged head portion 120 for riding on the top edge of the associated housing 90. The ports 112a through 115a on the top surface of the member 109 are readily accessible for attachment as by means of couplings and associated preferably flexible fluid transmitting lines to for instance, the aforementioned fluid transmitting lines 30 on the boom. Thus it will be seen that fluid can be readily transmitted from the ports 92 through 95 on the underside of the housing 90 of assembly C, to the ports 112a through 115a on the top side of the rotatable collector ring 109 of the assembly C. As best seen in FIGS. 29, 30, 31 and 32, ports 112a through 115a, are offset laterally from their respective ports 112 through 115, and as best shown in FIG. 2, rotatable ring member 109 may have washer segments 122 secured thereto by bolts 124, for facilitating rotation of member 109. Member 109 may be provided with threaded openings 126 therein for attachment of frame 14 thereto, and as by means of bolts 128 (FIG. 2). Pin 130 may couple members 109 and 68 together for rotation (together with member 50) as a unit, upon horizontal rotation of the derrick. It will be seen therefore that in the embodiment shown, members 109, 68 and 50 may be said to be generally suspended from derrick frame 14, while housing members 90, 66 and 33 coupled together as a unit by rods 103, are more or less suspended interiorly of the pedestal 16 by pin and lugs 100, 102.

The elements forming the fluid transmitting means, and especially the interior collector ring members 50, 68 and 109 are preferably formed of ductile iron or some other such cast material, which makes it possible to conveniently form the fluid receiving grooves therein without the need for extensive machining operations, thus materially reducing the cost of the unit. It will be noted that pressurized fluid can be passed in both directions to different ports, and at the same time, and that such an arrangement completely eliminates the problem of twisted flexible lines upon movement of a rotatable derrick, for permitting movement of the derrick with respect to another area or object, and for instance the vehicle chassis.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

I claim:
1. A compact fluid transmitting means for a mechanism mounted for rotary movement about a generally vertical axis comprising,
    (a) a hollow pedestal adapted for mounting on a support,
    (b) a sleeve-like housing member having top and bottom surfaces and a cylindrical-like interior side surface,
        (1) said housing member being disposed in said pedestal,
    (c) fluid distributing ports in said housing member communicating with said interior surface and opening onto said housing member in a generally vertical direction with respect to said pedestal,
    (d) a ring-like member supported in said housing member and having an exterior side surface disposed in confronting relation to said interior surface, said ring-like member having top and bottom surfaces and being movably disposed in said housing member for relative rotational movement therebetween,
    (e) fluid distributing ports in said ring-like member communicating with said exterior surface and opening onto said ring-like member generally vertically in a direction opposite to the direction of opening of the first mentioned ports, and
    (f) means including endless circumferentially extending, axially spaced grooves on the side surface of at least one of said members communicating each of said ports in said housing member with a respective one of said ports in said ring-like member irrespective of the relative rotational positions of said housing and ring-like members.

2. Fluid transmitting means in accordance with claim 1 including, a means on one of said members for holding said one member stationary with respect to said pedestal while permitting rotation of the other of said members relative to said one stationary member.

3. Fluid transmitting means in accordance with claim 1 including,
    (a) a plurality of the housing members disposed in stacked relation,
        (1) means preventing fluid communication between said stacked housing members,
    (b) a plurality of the ring-like members disposed in stacked relation,
        (1) means preventing fluid communication between said stacked ring-like members,
    (c) means coupling said housing members together as a unit, and
    (d) means coupling said ring-like members together as a unit, said ports in each of said members being exteriorly accessible in a vertical direction in the stacked condition of said members.

4. Fluid transmitting means in accordance with claim 3, wherein
    (a) said plurality of housing members are of such relative size that when in stacked relation they are disposed in inverted stepped relation with one another,
    (b) said plurality of ring-like members are of such relative size that when in stacked relation they are disposed in inverted stepped relation with one another,
    (c) said ports in each of said housing members being disposed on the bottom surface of the respective housing member on the stepped portion thereof,
    (d) said ports in each of said ring-like members being disposed on the top surface of the respective ring-like member,
    (e) each of said ring-like members having a vertical opening extending therethrough of sufficient size to expose the ports in the underlying of the ring-like members.

5. Fluid transmitting means in accordance with claim 1 wherein,
    (a) said means comprises circumferentially extending grooves in the exterior surface of said ring-like member, each of said grooves communicating with a respective one of said ports in said ring-like member by a generally vertical passageway through said ring-like member, and
    (b) fluid sealing means integrally formed with said ring-like member and coacting with said groove to resist axial fluid flow between said confronting interior and exterior side surfaces.

6. Fluid transmitting means in accordance with claim 5 wherein,
    (a) at least said ring-like member is formed of castable metal, such as ductile cast iron, and
    (b) said grooves are integrally cast in said ring-like member,
    (c) said fluid sealing means comprising paired radial flanges on opposite sides of each of said grooves and adapted for sealing engagement with said interior surface of said housing member.

7. In combination,
    (a) a support, including a hollow stationary pedestal,
    (b) a derrick mounted on said pedestal for rotary movement about a generally vertical axis passing through the vertical axis of said pedestal, said derrick being adapted to mount a plurality of fluid powered motor units thereon, and
    (c) compact fluid transmitting means disposed interiorly of said pedestal for transferring operating fluid from the support to the derrick and vice versa for use in the motor units on the derrick, said fluid transmitting means comprising,
        (1) a sleeve-like housing member having top and bottom surfaces and an interior cylindrical-like side surface,
        (2) fluid distributing ports in said housing member, communicating with said interior surface and opening generally vertically onto said housing member,
        (3) a ring-like member supported in said housing member and having top and bottom surfaces, and an exterior surface disposed in confronting relation to said interior surface, said ring-like member being movably disposed in said housing member for relative rotational movement therebetween,
        (4) fluid distributing ports in said ring-like member communicating with said exterior surface and opening generally vertically onto said ring-like member in a direction opposite to the direction of opening of the first mentioned ports.
        (5) means including endless circumferentially extending, axially spaced grooves on the side surface of at least one of said members communicating each of said ports in said housing member with a respective one of said ports in said ring-like member irrespective of the relative rotational positions of said members,
    (d) means attaching one of said members to said support, and
    (e) means attaching the other of said members to said derrick for rotation therewith.

8. In combination,
    (a) a vehicle,
    (b) a hollow stationary pedestal mounted on said vehicle,
    (c) a derrick mounted on said pedestal for rotary movement about the vertical axis of said pedestal,
    (d) a plurality of hydraulic powered motor units mounted on said derrick for work operations in association with the said derrick, and
    (e) compact fluid transmitting means disposed interiorly of said pedestal, for transferring pressurized actuating fluid from a source on the vehicle to and from said motor units, said fluid transmitting means comprising,
- (1) a sleeve-like housing member having top and bottom surfaces and an interior cylindrical side surface,
- (2) means securing said housing member to said pedestal for preventing relative rotary movement between said pedestal and said housing member,
- (3) fluid distributing ports in said housing member communicating with said interior surface and opening vertically onto said bottom surface,
- (4) a ring-like member supported in said housing member and having top and bottom surfaces, and an exterior side surface disposed in confronting relation to said interior surface, said ring-like member being movably disposed in said housing member for relative rotational movement therebetween,
- (5) fluid distributing ports in said ring-like member communicating with said exterior surface and opening vertically onto said top surface of said ring-like member,
- (6) a plurality of endless circumferentially extending axially spaced grooves in the exterior surface of said ring-like member, each of said grooves communicating by generally vertically extending passageways with a respective one of said ports in said ring-like member, and with a respective one of said ports in said housing member, and,
- (7) fluid sealing means integrally formed with said ring-like member for generally sealing operating fluid in said grooves against axial movement of operating fluid between said housing member and said ring-like member,
- (f) and means securing said ring-like member to said derrick for rotation therewith.

9. The combination in accordance with claim 8, wherein there is provided,
- (a) a plurality of the housing members disposed in stacked relation,
- (b) a plurality of the ring-like members disposed in stacked relation,
- (c) means including elongated tie rods securing said housing members together as a unit,
- (d) means including pins and coacting recesses in said ring-like members coupling said ring-like members together as a unit,
- (e) said members being of such relative size that they are disposed in stepped relation when in stacked condition,
- (f) said ports in each of said housing members being disposed in the step portion of the respective member and facing downwardly,
- (g) said ports in each of said ring-like members being disposed in the step portion of the respective member and facing upwardly,
- (h) each of said ring-like members having a vertical passage completely therethrough of sufficient size for exposing the upwardly facing ports in the underlying of the ring-like members,
- (i) said fluid sealing means comprising paired flanges on opposite sides of each of said grooves and adapted for sealing engagement with said interior surface of said housing member, and
- (j) said ports in said housing members and in said ring-like members being generally offset to one side of the respective member as viewed in plan.

References Cited by the Examiner

UNITED STATES PATENTS

| | | | |
|---|---|---|---|
| 464,706 | 12/1891 | Burn | 285—134 |
| 2,404,494 | 7/1946 | Halby et al. | 285—134 |
| 2,590,787 | 3/1952 | Nickles | 212—38 |
| 2,698,664 | 1/1955 | Freeman | 285—190 |
| 2,768,843 | 10/1956 | Zeilman | 285—190 |
| 2,903,949 | 9/1959 | Simmonds | 173—28 |
| 2,959,260 | 11/1960 | Johnson et al. | 212—38 |
| 3,116,840 | 1/1964 | Carbert et al. | 173—28 |

BROUGHTON G. DURHAM, *Primary Examiner.*